March 21, 1950 H. R. VAN DEVENTER 2,501,486

TELEPHONE-PHONOGRAPH SYSTEM

Filed July 12, 1944 2 Sheets-Sheet 1

HARRY R. VAN DEVENTER
INVENTOR.

BY

Van Deventer & Greene
Attorneys.

March 21, 1950 H. R. VAN DEVENTER 2,501,486

TELEPHONE-PHONOGRAPH SYSTEM

Filed July 12, 1944 2 Sheets-Sheet 2

HARRY R. VAN DEVENTER
INVENTOR.

BY

Van Deventer & Grier
Attorneys.

Patented Mar. 21, 1950

2,501,486

UNITED STATES PATENT OFFICE 2,501,486

TELEPHONE-PHONOGRAPH SYSTEM

Harry R. Van Deventer, New York, N. Y.

Application July 12, 1944, Serial No. 544,564

21 Claims. (Cl. 179—6)

This invention relates to a telephone-phonograph system and has for its object the provision of a special type of telephone service particularly useful to transient visitors to a city, for example, who want telephone facilities for a short time and who do not have access to a regular subscriber's instrument. The ordinary pay station does not answer their requirement, for they cannot receive messages there without remaining at the telephone.

They also desire to be able to telephone others and leave a number where messages for them will be received.

The so-called "message service" companies do not, as a rule, handle this class of business and the availability of their services is not generally known to the public.

The present invention can be practiced using existing telephone equipment commonly found in railway stations and other public places, and makes the special service herein described readily available to the public, as it can be brought directly to their notice wherever public telephone pay stations are used. The prospective user can, in a few minutes, make all rental arrangements that will provide him with a telephone number that he can give any one he wishes to have call him for a designated period the person calling will first receive a message the user has left, and then the calling party can leave a message that will be automatically recorded on a phonograph record which the user can play back upon his return to the rented station.

Several classes of this special service may be rendered, and by way of illustration, these are designated class A and B herein. It will be understood, however, that features disclosed in the drawings and description of one class may be used with another, and that such other variations are contemplated when within the scope of the appended claims.

Figure 1:
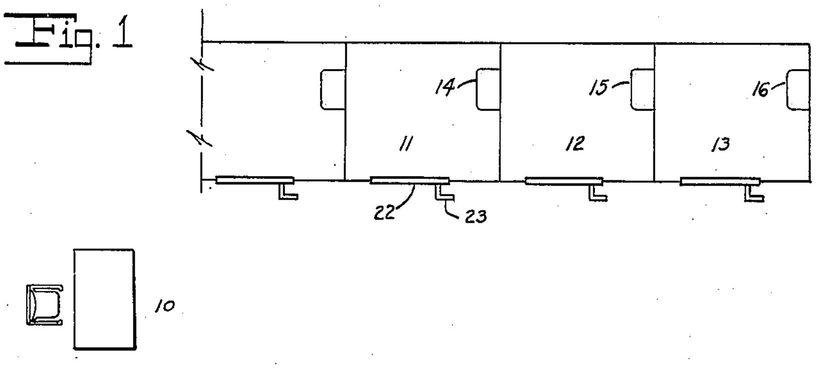
Figure 1 is a diagram of an attendant's desk and pay station booths adjacent thereto, which may be used with the system herein disclosed.
Figure 2:
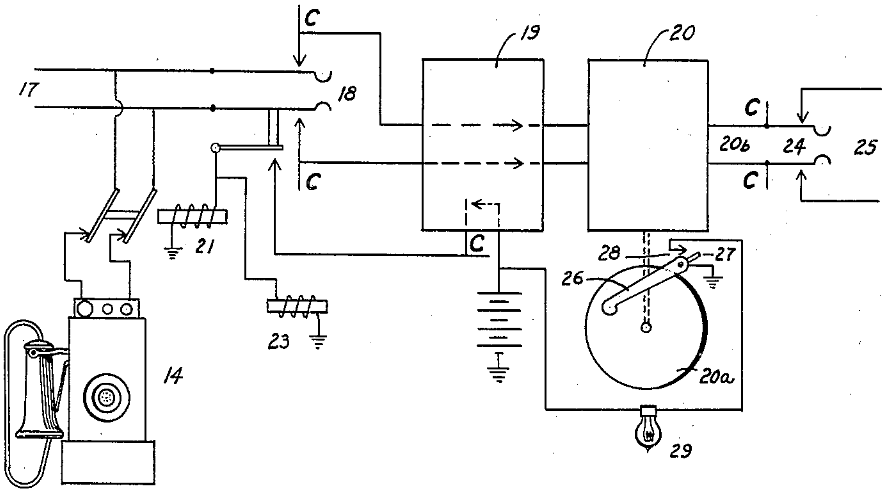
Figure 2 is a schematic diagram of a system disclosed herein where the apparatus is operated by an attendant.

The class A system, as shown in Figures 1 and 2, may be used where an attendant at the desk 10 receives the public and makes the necessary connections and directs the users to the booths or compartments 11, 12, 13, any number of which may be used. The telephone instrument 14, 15, 16, in these booths may be ordinary sub-sets where the attendant collects the charges and makes connections, or the sub-sets may be provided with the usual coin boxes.

It will be understood that the apparatus, Figures 1 and 2, is not in a central office, as the attendant only handles outgoing calls, or calls that are incoming by reason of calls originating at the telephones here shown. The attendant does not interconnect lines as does a central office operator.

Referring to Figure 2, a plurality of communication circuits such as telephone lines, one of which is shown at 17, terminate on the desk 10 and by any suitable means may be connected to any of the sub-sets 14, 15, 16, which are then used in the usual manner. These lines are often permanently connected to the sub-sets, whose number plates bear the regular directory numbers of these lines. They are almost exclusively used for outgoing calls, and seldom for incoming calls except reverting calls.

A person desiring the special service herein described notifies the attendant, stating for how long as he wants the service—say from 9 a. m. to 4 p. m.

The attendant then assigns to this person (hereinafter called the renter) a number corresponding to one of the lines, such as 17. This may be "Main 5100" (sub-set 14) and this becomes that person's telephone number for the period of time aforesaid.

The attendant now, via a plug or key 18 on desk 10, connects line 17 to a manually settable time-switch 19, the construction of which is well known and so is not described. This switch, via contacts shown in dotted lines, will when operated connected the phonograph 20 to line 17, and may also disable the sub-set 14 by operating disconnect relay 21 or by locking door 22, Figure 1, of the booth in which sub-set 14 is located by means of the electric lock 23, Figure 2. This prevents the use of this sub-set until 4 p. m. Lock 23 may be of the type where a key can only be turned or withdrawn when the lock is energized, the actual locking of the door being done manually.

The phonograph is generally of the type described in U. S. Patent No. 2,340,147 dated January 25, 1944, and the attendant has made a "talk-out" record and placed it in the phonograph as described in said patent. This record may have any suitable message thereon, such as "This is Main 5700, the number given you by Mr. Jones (the renter). Mr. Jones will return here at 4 p. m. and will then receive any message you leave. When you hear the signal speak your message clearly and it will be recorded and Mr. Jones will receive it at 4 p. m."

Of course, any other message can be left on the phonograph. A suitable "stock" message that can be used with any subset (as it requires no individual preparation) is:

"This is Main 5700. No one is here but a recording phonograph will take your message and deliver it to the party who gave you this number. When you hear the signal, speak your message clearly and it will be recorded and delivered when the party returns."

Main 5700 will be connected by the central office operator in the usual way and the calling subscriber will receive the foregoing message and may then speak. This speech will be recorded on a record in the phonograph all as described in the aforesaid patent.

During the time 9 a. m. to 4 p. m., the renter may call the attendant, who by key 24 may connect the play-back circuit $20^b$ of phonograph 20 to a telephone line such as 25, over which the renter is calling and play back any messages recorded for him; or, at 4 p. m., the renter may come to the attendant who can then play back to him on the spot all of the recorded messages.

At 4 p. m. the timer 19 will operate to disconnect phonograph 20 and reconnect sub-set 14 to line 17 if it has been previously disconnected therefrom and/or operate lock 23 to unlock the booth door 22, thereby restoring line 17 and its associated sub-set to normal and make it available for ordinary service. The attendant can remove the receiving record from phonograph 20 and mail it to the renter if he has so requested, or otherwise dispose of it.

By the use of keys or plugs 18 it is not necessary to have a phonograph and its associated equipment for each incoming line such as 17, but only enough phonographs may be used as required by the traffic. The wires marked C in Figure 2 are common to certain keys (if keys are used such as 18), which any one phonograph is to serve.

It will be observed that once the attendant has set up the apparatus shown in Figure 2, she has nothing to with recording the incoming calls and nothing to do except keep the renter advised as to messages recorded and deliver the record to the renter if he wants it. The timer 19 automatically terminates the phonograph service when the rental time has expired and restores the line 17 to normal without the attendant's operation of key 18 if that should be overlooked.

The recording records $20^a$ with this system may be designed to take practically any number of messages, but in order to use inexpensive throw-away flat discs 8" to 10" in diameter, which will only take 8 to 10 messages of thirty seconds duration each, it is well to have a warning signal to notify the attendant to put on a new disc when one is about exhausted. This may be accomplished by equipping the recorder arm 26 of the phonograph (or some other part that has a corresponding movement therewith relative to the record) with a contact 27, which—when the arm has about reached the end of its travel as occurs when the disc is about full—will close against contact 28 and thereby cause lamp 29 to be illuminated, thus warning the attendant to put on a new record.

This warning signal, therefore, occurs due to the relative movement of the record and some other part of the phonograph, and occurs at a predetermined point in said movement and after a predetermined number of revolutions of the motor (not shown) driving the phonograph 20 and record $20^a$.

Figures 3, 4:
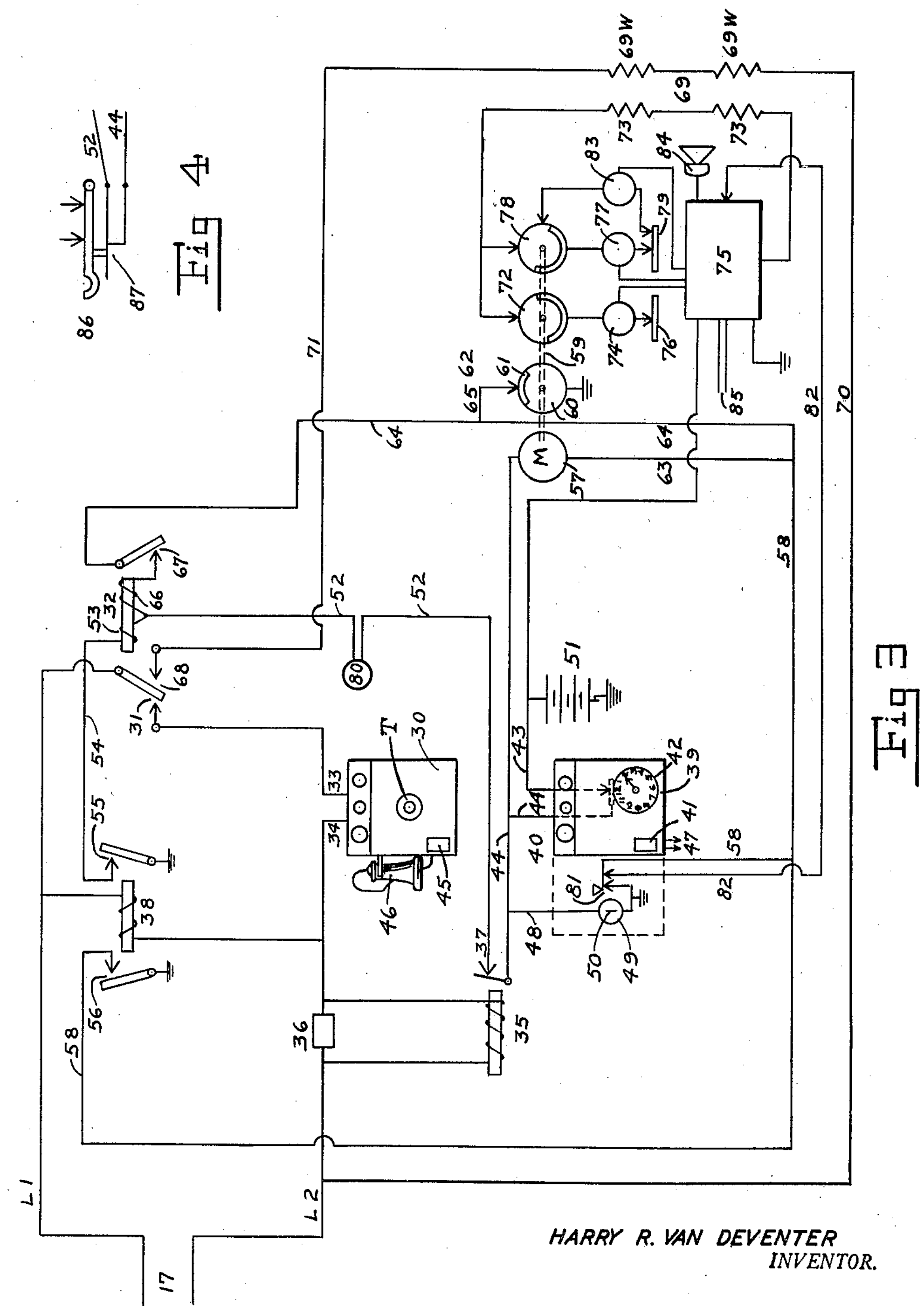
Figure 3 is a schematic diagram of another system disclosed herein which requires no attendant at the apparatus.
Figure 4 is a diagram of a modified form of the hook switch of the sub-set 30 of Figure 3.

Figure 3 is a diagram showing what may be termed a class B system which can be used where there is no attendant. Here the numeral 30 denotes an ordinary sub-set of any suitable type equipped with the usual coin box. This sub-set is normally connected to the telephone line 17 ($L^1$ and $L^2$) via $L^1$, normally closed back contact 31 of locking relay 32, conductors 33, 34, winding of relay 35 to $L^2$. Relay 35 may be any suitable type that will not seriously affect the transmission characteristics of the sub-set and is also bridged by condenser 36 which affords a ready path for ringing current so that relay 35 will not be operated thereby.

The sub-set 30 is used in the usual manner, and when in use, relay 35 in series therewith and with the line 17 in a common battery system will open contacts 37 by reason of current flowing over the line, thereby disabling the phonograph circuits to be presently described, so that the sub-set 30 can be used for outgoing calls even if the phonograph has been conditioned for service.

A ringing relay 38 is bridged across line 17 with condenser 36 in series and this relay will be operated whenever an operator rings on line 17, which is seldom on pay station lines where most calls are outgoing. The operation of relay 38, however, does not affect the circuits in any way unless the phonograph timer 39 is operating. From this it will be seen that sub-set 30 can be used in the usual manner for both incoming and outgoing calls.

The operation of the phonograph apparatus will now be described. This includes a suitable timing device generally indicated by the numeral 39 having the coin slots 40 and coin return chute 41 and a dial 42 for indicating the time paid for. This device is of the type wherein, upon depositing a coin or coins, a movable contact member of the timer is thereby set to hold a contact closed for a period of time dependent upon the coin deposited, and to open such contact at the expiration of said time.

Such time switches, or prepay meters, are well known and so they are not here described in detail. Timer 39 closes a circuit between conductors 43 and 44 for a period of time dependent upon the coins deposited in coin slots 40, say one hour for fifty cents.

A renter desiring the phonograph service first deposits a coin in the coin box of sub-set 30 and calls the operator in the usual way. Upon ascertaining that the renter wants phonograph service, the operator operates her refund key and refunds at 45 the coin deposited in the usual manner.

The operator advises the renter of the amount to be deposited, and the renter now deposits the necessary amount in the timer 39, say $3.50 for seven hours. The operator receives the signals as the coins drop in the coin slots 40 as the timer is located adjacent the sub-set 30 and the operator hears the timer coin signals via the transmitter T of the sub-set, the receiver 46 of which is off the hook.

Should the renter deposit the wrong amount in the timer, the operator, by throwing her refund key, can return the coins deposited via chute 41, the coin-return mechanism of the timer 39 being connected via circuit 47 with the coin-return mechanism in the sub-set 30 so as to be operable over line 17.

The correct amount having been deposited in the timer, it will be set to connect conductors 43, 44 for a period of seven hours, and at the same time a circuit is completed from conductor 44 to conductor 48 through lock 49 to ground as shown.

The renter is told to remove key 50 from the lock, and he retains this key for play-back purposes to be presently described. The renter now hangs up receiver 46 and may leave the instrument. He notes the number of the sub-st 30, say Main 5700, and he can use that as his telephone number for the rental period.

The timer contacts being closed, a circuit is set up or "enabled" from the source of current 51 via conductor 43, contacts of timer 39, conductor 44, contacts 37, conductor 52 (including signal 80), winding 53 of relay 32, conductor 54, and to the normally open contact 55 of relay 38. Relay 32 does not operate as the circuit is open at 55.

Now, if a subscriber calls the sub-set 30 and the operator at the central office rings on the line, relay 38 will be operated and close contact 55, momentarily completing the circuit just set up to contact 55, to ground. Usually machine ringing is used, which has successive "off" and "on" intervals. During the "on" intervals, or ringing periods, relay 32 holds both sets of contacts 55 and 56 closed.

When contact 56 closes, a circuit is completed from the energy source 51 via conductor 44 through phonograph motor 57 and via conductors 63 and 58 to ground at 56. This operates motor 57 momentarily during each ringing period.

As motor 57 operates, it revolves shaft 59 (indicated diagrammatically in Figure 3 as a dotted line) which revolves the grounded timer disc 60. At the beginning of the cycle, the insulated sector 61 of this disc is immediately below the contact member 62 which is therefor out of electrical contact with the disc. As the motor revolves, the disc 60 is revolved thereby in the direction of the arrow. The sector 61 may be of such dimensions that, say, 6 ringing impulses on relay 38 are necessary to cumulatively operate the motor 57 sufficiently to move the sector 61 anticlockwise below the member 62 sufficiently to permit said member to contact disc 60, whereupon a direct circuit independent of relay 38 is established through the motor 57 as follows:

From current source 51 via conductor 43, contacts in timer 39, conductor 44, motor 57, conductor 63, conductor 64, conductor 65, contact 62, disc 60 to ground. Motor 57 will now operate continuously until the disc 60 revolves to bring sector 61 thereon under contact 62 thereby opening the circuit and disconnecting the motor.

Now, as heretofore described, a circuit has been set up through relay 32 to contacts 55 on relay 38 so when the latter relay closes, winding 53 on relay 32 is energized and 32 operates. This operation is only momentary and follows the opening and closing of contacts 55 on relay 38 during each ringing cycle until the contact 62 is on disc 60 whereupon relay 32 is locked closed by reason of a circuit which can be traced from the source 51 to conductor 43, contacts in timer 39, conductor 44, contacts 37 on relay 35, conductor 52 (including signal 80), locking winding 66 on relay 32, contact 67, conductor 64, conductor 65, contact 62 and timer disc 60 to ground. While relay 32 is locked closed, contacts 31 thereon are opened, thereby disconnecting the sub-set 30 from circuit 17 while the phonograph is in operation and contact 68 is closed thereby connecting winding $69^w$ of repeating coil 69 via conductors 70 and 71 across the telephone line 17. This will extinguish the operator's supervisory signal so she will know the call is answered, and will give the disconnect signal when relay 32 opens its contacts as hereinafter described, which occurs when the phonograph completes its cycle of operations.

As motor 57 and shaft 59 driven thereby revolve, the timing disc 72 driven in proper timed relation thereby connects windings 73 of repeating coil 69 to the reproducer 74 and amplifier and control unit 75, and this reproducer in contact wth record 76 will reproduce any message left on said record such as the message in column 3 hereof, which "talk-out" record will be heard by the calling subscriber via said coil 69.

Upon the completion of the delivery of the talk-out record, the reproducer 74 is disconnected from the repeating coil circuit by the operation of disc 72 and the recorder or cutter head 77 and the amplifier and control unit 75 is connected thereto by the operation of disc 78 which operates same as disc 72 just described, to connect the recorder 77 to record blank 79 for the duration of this recording period which may be of any predetermined duration and during which the calling subscriber, by speaking into his telephone, may record any desired message on record 79.

At the termination of the recording period, the sector 61 on time disc 60 has reached a position where it opens the circuit by removing the ground on conductors 64, 65. This opens the circuits through motor 57 and locking winding 66 on relay 32. The motor stops and the relay opens its contacts, and contact 31 thereof is restored, thus reconnecting the sub-set 30 to the telephone line circuit 17 ready for use and giving the central office operator the usual disconnect signal. The operations just described will be repeated as often as an operator rings on the line a sufficient number of times to operate the disc 60 sufficiently to operate the control at 62, as long as the contacts in timer 39 are closed, and any incoming messages will be recorded on the record blank 79 of the phonograph.

Should someone wish to use the sub-set 30 while the phonograph is in operation delivering or recording a message, they cannot do so as it is disconnected from the telephone line 17. This busy condition can be visually indicated by the signal 80 mounted adjacent the sub-set 30 and arranged to display a target or to illuminate a sign containing a proper notice. This will warn a prospective user from dropping coins into the sub-set coin box, but if such coins are deposited, they will pass through the set to be returned at 45 with some types of coin boxes.

Should someone use the sub-set 30 while the phonograph is not in operation delivering or recording messages, they can do so in the usual manner. If, while the line is so in use, a calling subscriber should want to call to use the phonograph, the line would be "busy" to him in the usual manner and he could call later. Therefore, the attachment of the phonograph to the line 17 does not affect the normal operative procedure, nor does it tie up the use of the telephone line 17 for outgoing messages while the phonograph is operatively connected thereto via the timer 39.

Should some user of the sub-set 30 make a call and be told to wait at the telephone to be called back, he will, of course, answer the reverting call immediately. Being right at the sub-set 30, he answers as soon as he hears the bell. This operates relay 35 which via its contacts 37 opens the current supply via conductor 52 to relay 32 so that it is not operated by relay 38 and cannot lock its self. This occurs before the timer disc 60 has revolved sufficiently to establish the circuit between it and contact 62. The user therefore has control of the sub-set 30 and can answer an incoming call before the phonograph goes into operation and prevents said operation until he has finished his connection. The sub-set 30 can therefore be used for both incoming and outgoing calls while the timer 39 is in closed circuit position. Yet the renter of the phonograph service is assured a telephone at which messages for him will be received during the time for which he has paid.

The renter must return to the installation to get the messages recorded on record 79 before the expiration of the time for which he has paid.

He now returns key 50 to lock 49 from which it cannot be removed unless another deposit is made in the timer coin box. If such deposit is made, then the following play-back operation can be carried out, the key removed and the timer will continue to operate for the extended time covered by the additional sum deposited. If no additional deposit is made, the key remains in the lock. In either event the play-back is accomplished as follows:

The renter unlocks the case of the timer 39 and finds inside the push button 81 which when pressed grounds the conductor 58 thereby completing a circuit through motor 57. The motor now starts. The button also via conductor 82 completes a circuit to a switching device in amplifier unit 75 which connects the reproducer 83 on record 79 to the loud speaker 84 through which the renter hears the messages recorded on the record 79.

Obviously, the renter can repeat the play-back operation as often as desired in order to write down any messages et cetera, as long as the contacts in timer 39 remain closed.

Upon the expiration of the time paid for, timer 39 opens its contacts which disables the current feed 43 so that the phonograph is no longer operable over line 17. Push-button 81 for the play-back is also disabled.

No attempt has been made to describe the phonograph and timer mechanisms in detail as their construction can be varied within wide limits. Only the sequential functioning has been described in order to illustrate the operation of the circuits herein disclosed.

Such sequentially operating phonographs wherein a talk-out message is first delivered, then a recording made, and wherein one or more of said recordings can be played back, are described in the U. S. patent heretofore mentioned.

Coin controlled timers such as 39 are in common use with prepay electric and gas meters and time switches.

Locks, such as 49, in which the keys 50 are held for release upon the deposit of a coin and which, when said key is replaced it is retained in the lock, are in common use.

Nor, have the coin boxes in sub-set 30 and the timer 39 and their coin-return features been described, as the construction of these are well known.

The current source 51 may be either local batteries, current supplied via a trunk from the central office or any other suitable source of operating current. This also applies to the current source connected at 85 to the amplifier and control unit 75. This would usually be 110 v., 60 cycle, A. C.

It is assumed that the line 17, Figure 3, is connected to a common battery exchange. This is necessary for the operation of relay 35. If the line 17 terminates in a magneto exchange, then, referring to Figure 4, the hook switch 86 of sub-set 30 is equipped with a pair of contacts 87 which open when the receiver 46 is off the hook and operate in exactly the same manner as the contacts 37 of relay 35 with common battery.

Figure 5:
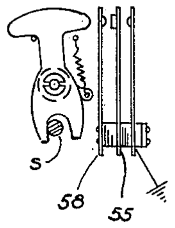
Figure 5 is a diagram of a form of ringer switch that can be used in sub-set 30 of Figure 3.

Instead of the relay 38, the ringer (not shown) of sub-set 30 may be equipped with contacts 56[1]. The operation of such a ringer is described in U. S. Patent No. 2,332,359, dated October 19, 1943, particularly Figures 4 and 5 thereof, and these contacts are connected as shown in Figure 5 hereof. The operation of these contacts is the same as described in connection with Figure 3, and as will be apparent from a study of this patent when the ringer, striker arm S, Figure 5, of sub-set 30 operates, these contacts will be closed, the ringer performing the function of relay 38 as herein described.

While "grounds" are shown in the circuit diagrams, it will be understood these are merely diagrammatic in order to avoid the complication of showing full metallic circuits. No "grounds" are necessary in practice, except in some systems in connection with coin return, which circuits form no part of the present invention except to the extent indicated.

What is claimed is:

1. The combination of a telephone, a recording phonograph, a line circuit and a manually settable time switch connected to said circuit and said phonograph, said switch including contact members adapted to directly connect and disconnect same whereby said phonograph may record messages received via said line circuit, said switch being settable to operate at any desirable time interval.

2. The combination of a compartment having a door and locking means therefor, a telephone instrument in said compartment and adapted to be enclosed therein when the door of the compartment is closed, a telephone circuit connected to said instrument, a phonograph, and means including a manually settable time switch for connecting said phonograph to said circuit and simultaneously operating said locking means to lock said instrument in said compartment when said phonograph is so connected.

3. The combination of a compartment having a door and locking means therefor, telephone instrument in said compartment, a line circuit, a phonograph, means including a time switch for connecting said phonograph to said circuit and operating said locking means when said phonograph is so connected, and means controlled by said time switch for connecting and disconnecting said telephone instrument and line circuit.

4. The combination of a telephone instrument, a line circuit normally connected to said telephone instrument, a phonograph, means including a time switch for connecting said phonograph to said line circuit, and means controlled by said time switch for disconnecting said telephone from said line circuit while said phonograph is connected thereto.

5. A phonograph including a record and means for recording sound thereon including a motor, a communication circuit, means connected to said circuit and operable by current flowing therein for controlling said motor, and signalling means adapted to give a visual signal at said phonograph controlled by the relative movement of said record and recording means and operable by a predetermined number of revolutions of said motor.

6. The combination with a line circuit of a telephone instrument and a recording phonograph and means including a manually settable time switch including contacts physically connected to said circuit for alternately connecting said telephone instrument and phonograph to said circuit.

7. The combination as claimed in claim 6 including manually operable switching means serially included in circuit with the line circuit and the time switch.

8. The combination with a line circuit of a recording phonograph and a manually settable time switch for connecting said circuit and phonograph for predetermined intervals, said switch being settable to operate at any desired time interval.

9. The combination as claimed in claim 8 including a manually operable switching means serially included in circuit with the line circuit and the time switch.

10. Apparatus to render the herein described service including in combination, an attendant's desk or station, a plurality of sub-sets, a plurality of line circuits connected to some of said sub-sets, a phonograph, a time switch connected to said phonograph and adapted to be manually set to function for a predetermined period, and switching means on said attendant's desk for connecting some of said line circuits and said sub-sets to said phonograph via said time switch to record a message over said line circuit, the duration of said connection being controlled by said switch.

11. The combination as claimed in claim 10 including means controlled by said time switch for disconnecting any sub-set that may be connected to the same line circuit as the time switch for the period that said phonograph is connected to said line circuit.

12. The combination as claimed in claim 10 including a play-back circuit connected to the phonograph and switching means on said attendant's desk whereby said play-back circuit may be connected to some of said line circuits.

13. In combination with a line circuit, a phonograph, means for connecting said phonograph to said line circuit including a device responsive to current flowing in said line circuit, means for disconnecting said phonograph from said circuit, and a time switch connected to said phonograph to limit the duration of its connection to said circuit independently of said last means.

14. In combination with a line circuit, a sub-set normally connected thereto, a phonograph, means for connecting said phonograph to said line circuit including a device responsive to current flowing in said line circuit, means for disconnecting said phonograph from said circuit, a time switch connected to said phonograph to limit the duration of its connection to said circuit independently of said last means, and means for disconnecting said sub-set from said line circuit while said phonograph is in operation.

15. In combination, a line circuit, a sub-set normally connected thereto, a phonograph, means for connecting said phonograph to said line circuit including a device responsive to current flowing in said line circuit, and a time switch including drop-coin signals located adjacent said sub-set whereby said coin signals may be transmitted over said sub-set, said switch being connected to said phonograph to limit the duration of its connection to said circuit.

16. In combination a line circuit, a sub-set normally connected thereto, a phonograph, means for connecting said phonograph to said line circuit including a device responsive to current flowing in said line circuit, a time switch including drop-coin signals located adjacent said sub-set whereby said coin signals may be transmitted over said sub-set, said switch being connected to said phonograph to limit the duration of its connection to said circuit, a casing, a lock for said casing including a key removable upon the energization of said time switch, a switch device within said casing and play-back mechanism associated with said phonograph and controlled by said last switch device.

17. In combination, a line circuit, a sub-set including a coin box adapted to produce signals as coins are dropped therein normally connected to said line circuit, a phonograph, a time switch including a coin box adapted to produce signals as coins are dropped therein, means for connecting said phonograph to said line circuit, means for disconnecting said phonograph from said line circuit, both said means being controlled by said switch.

18. In combination, a line circuit, a sub-set including a coin box adapted to produce signals as coins are dropped therein normally connected to said line circuit, a phonograph, a time switch including a coin box adapted to produce signals as coins are dropped therein, means for connecting said phonograph to said line circuit, means for disconnecting said phonograph from said line circuit, both said means being controlled by said switch, said sub-set being adapted to transmit signals produced by said time switch coin signals to said line circuit.

19. In an apparatus of the class described, a line circuit, a sub-set normally connected thereto, a recording phonograph, means including a time-switch for connecting said phonograph to said line circuit, and signal means controlled by said means and adapted to be displayed when said phonograph is in operation to notify prospective users of the sub-set that the line circuit is in use.

20. The combination as claimed in claim 19 including means operable when the sub-set is in use to disable the phonograph and said signal.

21. The combination as claimed in claim 19 including means operable when the phonograph is in use and controlled thereby to disable the sub-set.

HARRY R. VAN DEVENTER.

REFERENCES CITED

The following references are of record in the file of this patent:

UNITED STATES PATENTS

| Number | Name | Date |
|---|---|---|
| 1,337,858 | Thum et al. | Apr. 20, 1920 |
| 1,804,559 | Hocke | May 12, 1931 |
| 1,831,331 | Thorton | Nov. 10, 1931 |
| 1,843,849 | Thorton | Feb. 2, 1932 |
| 1,897,533 | Richey | Feb. 14, 1933 |
| 2,282,100 | Thompson | May 5, 1942 |
| 2,313,852 | Van Deventer | Mar. 16, 1943 |
| 2,316,238 | Haigh et al. | Apr. 13, 1943 |
| 2,321,053 | Van Deventer | June 8, 1943 |
| 2,337,568 | Owens | Dec. 28, 1943 |
| 2,340,160 | Van Deventer | Jan. 25, 1944 |

FOREIGN PATENTS

| Number | Country | Date |
|---|---|---|
| 178,278 | Switzerland | Sept. 16, 1935 |